(12) United States Patent
Benedicto et al.

(10) Patent No.: US 8,670,167 B2
(45) Date of Patent: Mar. 11, 2014

(54) COLOR GAMUT DETERMINATION WITH NEUGEBAUER-PRIMARY AREA COVERAGES FOR A PRINT SYSTEM

(75) Inventors: Jordi Arnabat Benedicto, Tarragona (ES); Peter Morovic, Barcelona (ES); Jan Morovic, Colchester (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 975 days.

(21) Appl. No.: 12/605,715

(22) Filed: Oct. 26, 2009

(65) Prior Publication Data

US 2011/0096345 A1    Apr. 28, 2011

(51) Int. Cl.
*G03F 3/08* (2006.01)

(52) U.S. Cl.
USPC .............. 358/518; 358/1.9; 358/2.1; 358/515

(58) Field of Classification Search
None
See application file for complete search history.

(56) References Cited

U.S. PATENT DOCUMENTS

| | | | |
|---|---|---|---|
| 5,416,890 A | 5/1995 | Beretta | |
| 5,450,216 A | 9/1995 | Kasson | |
| H1506 H | 12/1995 | Beretta | |
| 5,553,199 A | 9/1996 | Spaulding et al. | |
| 5,583,666 A | 12/1996 | Ellson et al. | |
| 5,625,378 A * | 4/1997 | Wan et al. | 345/600 |
| 5,809,213 A | 9/1998 | Bhattacharjya | |
| 6,229,626 B1 | 5/2001 | Boll | |
| 6,381,361 B1 | 4/2002 | Silverbrook et al. | |
| 6,459,425 B1 | 10/2002 | Holub et al. | |
| 6,480,299 B1 | 11/2002 | Drakopoulos et al. | |
| 6,654,143 B1 | 11/2003 | Dalal et al. | |
| 6,724,500 B1 | 4/2004 | Hains et al. | |
| 6,972,869 B2 | 12/2005 | Harrington | |
| 7,075,643 B2 | 7/2006 | Holub | |
| 7,177,465 B1 | 2/2007 | Takahira | |
| 7,233,413 B2 | 6/2007 | Jones et al. | |
| 7,411,701 B2 | 8/2008 | Boll | |
| 7,421,117 B2 | 9/2008 | Kondo et al. | |
| 2007/0291312 A1 * | 12/2007 | Kaneko et al. | 358/2.1 |
| 2008/0030787 A1 | 2/2008 | McElvain | |
| 2008/0294363 A1 | 11/2008 | Parmar et al. | |
| 2010/0214576 A1 * | 8/2010 | Morovic et al. | 358/1.9 |

OTHER PUBLICATIONS

U.S. Appl. No. 12/390,214.
C. Bradford Barber, David P. Dobkin and Hannu Huhdanpaa: The Quickhull Algorithm for Convex Hulls: ACM Transactions on Mathematical Software; Dec. 1996: pp. 1-15: vol. 22 No.
K. Schittkomski; NLPQL: A Fortran Subroutine Solving Constrained Nonlinear Programming Problems: Annals of Operations Research; Jun. 1985: pp. 485-500 No. 5: J. C. Baltzer A.G.

* cited by examiner

*Primary Examiner* — Twyler Haskins
*Assistant Examiner* — Christopher D Wait

(57) ABSTRACT

Method of determining a color gamut of a predetermined print system, comprising determining ink restrictions of the print system, generating all NP states of the print system, generating a convex hull of area coverages of NPs that do not exceed said ink restrictions, determining which NP states are outside of the convex hull, mapping NP states that are outside of the convex hull onto the convex hull, re-expressing the mapped NP states as area coverages of NPs, and sampling the convex hull in a colorimetrically predetermined way.

7 Claims, 3 Drawing Sheets

COLOR GAMUT DETERMINATION WITH NEUGEBAUER-PRIMARY AREA COVERAGES FOR A PRINT SYSTEM

BACKGROUND OF THE INVENTION

Determining a color gamut of a print system's pipeline usually requires specifying ink restrictions. The ink restrictions define a region of the addressable ink space for a given substrate. The ink restrictions include a total ink limit and sometimes cut-offs per ink. The parameters for a maximum addressable ink space are determined by printing and measuring color charts and trying to prevent image quality compromising artifacts while addressing the full possible color gamut for the substrate.

A traditional approach to determine an addressable color gamut includes the following steps. Ink ramps are printed to determine an overall ink limit. The cut-offs per ink are also determined by visual inspection. Then, a chart of patches using different inks is printed and measured. Image quality artifacts are detected. Also the ink efficiency is measured. Using this variety of steps, the ink limits are determined. Thereafter, a device CMYK or RGB contone to Ink contone (color separation) table is built whose values are within the predetermined ink limits, wherein the addressable ink space is limited by the above device CMYK or RGB contone to ink contone separation. After that, the printed combinations of device CMYK or RGB contone values are measured, wherein the color gamut of the print system pipeline is determined.

It is an object of the invention to facilitate a relatively large addressable color gamut for a print system pipeline.

BRIEF DESCRIPTION OF THE DRAWINGS

For the purpose of illustration, certain embodiments of the present invention will now be described with reference to the accompanying diagrammatic drawings, in which.

DETAILED DESCRIPTION

Figure 1:
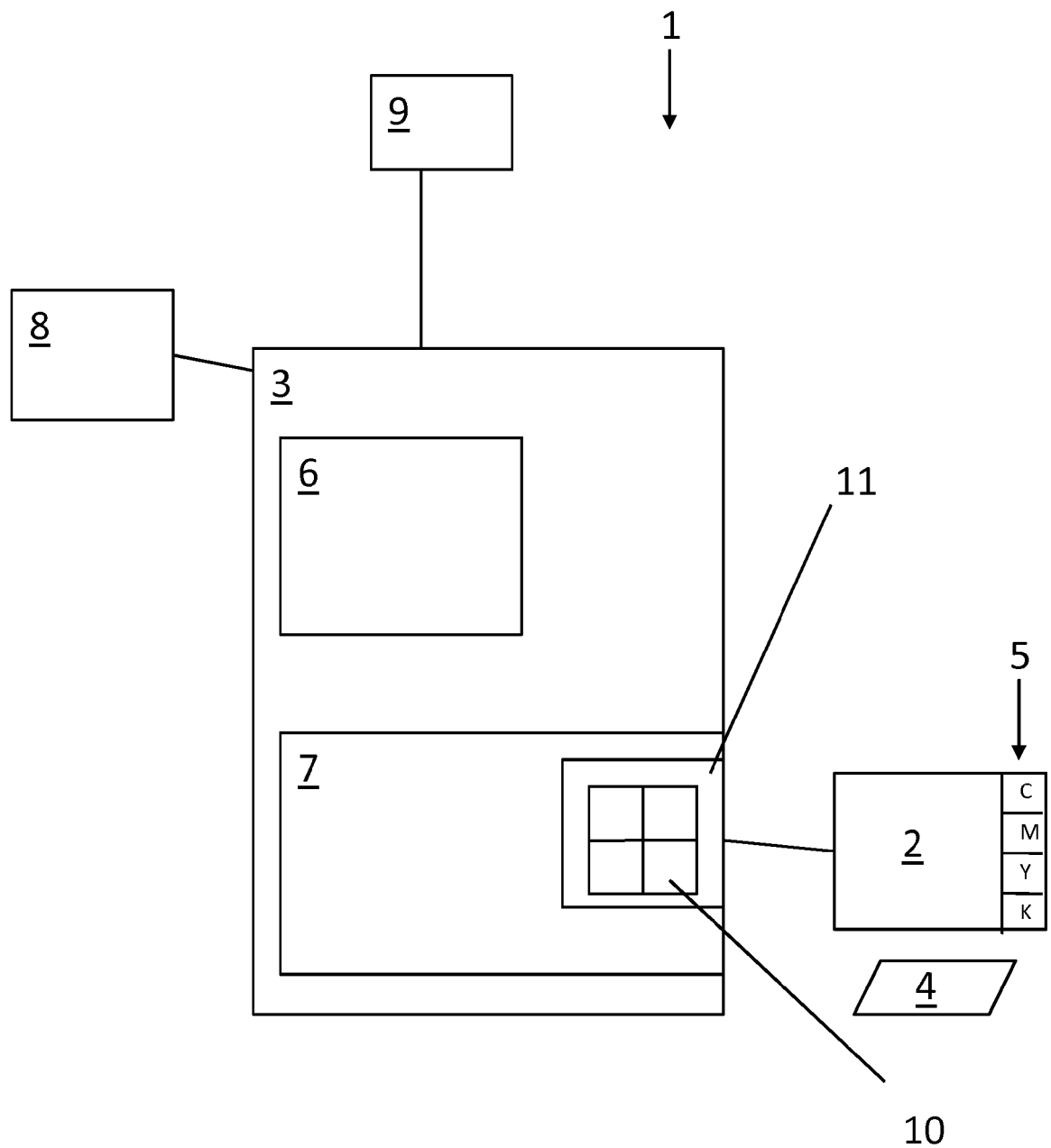
FIG. 1 shows a schematic diagram of a print system.

In the following detailed description, reference is made to the accompanying drawings. The embodiments in the description and drawings should be considered illustrative and are not to be considered as limiting to the specific embodiment of element described. Multiple embodiments may be derived from the following description through modification, combination or variation of certain elements. Furthermore, it may be understood that also embodiments or elements that may not be specifically disclosed may be derived from the description and drawings.

This disclosure describes various exemplary methods and computer products for printing a document in a printing system. In particular, this disclosure describes selecting certain Neugebauer Primaries (NPs) and Neugebauer Primary area coverages (NPacs) to optimize a printing process according to a certain print attribute.

Use of NPs and NPacs is disclosed in U.S. patent application Ser. No. 12/390,214, filed 20 Feb. 2009, now issued as U.S. Pat. No. 8,213,055, the contents of which are included herein by reference and which defines Neugebauer Primaries (NPs) and Neugebauer Primary Area Coverages (NPacs) as follows. The Neugebauer Primaries are all the possible combinations of a set of n inks. Each ink within the set may be at one of k levels for a single halftone pixel, where there are k.sup.n combinations for each ink set defining all of the possible ink configuration states that a single pixel can have. For example, where k=2 for a binary (or bi-level) printer, the printer is able to use either no ink or one drop of ink at a single pixel per ink channel. Given that NPacs represent linear, convex combinations of NPs (with relative area coverages being the convex weights), and as all of a printing system's NPacs are accessible, all colors inside the convex hull of a printing system's Neugebauer primaries' colors can be addressed.

In one embodiment, the Neugebauer Primaries are the possible combinations of a set of n inks. Each ink within the set may be at one of k levels for a single halftone pixel, where there are $k^n$ combinations for each ink set defining all of the possible ink configuration states that a single halftone pixel can have. For example, where k=2 for a binary (or bi-level) printer, the printer is able to use either no ink or one drop of ink at a single pixel per ink channel. For example, where n=2 the printer would have two ink channels, for example C and M. The possible combinations would then be White (W), C, M and CM, being $k^n=2^2=4$ possible combinations. For example, for a printer comprising six different inks and the ability to place either 0, 1, or 2 drops of each ink at each halftone pixel, resulting in $3^6$ or 729 NPs. A certain color may correspond to a certain NPac, which may be represented as a vector, wherein [W, C, M, CM]=[a(area)$_W$%, a$_C$%, a$_M$%, a$_{CM}$%], where a$_W$%+a$_C$%+a$_M$%+a$_{CM}$%=100%.

NPacs may be represented by linear, convex combinations of NPs, wherein the relative area coverages over a unit area are the convex weights. An NPac may also represent a single NP, that NP having a 100% area coverage weight and the other NPs being at 0%. According to an embodiment in this disclosure, all of a printing system's NPacs are accessible, so the full color gamut of a printing system can be addressed.

The present disclosure may relate to, as further described in U.S. patent application Ser. No. 12/390,214, printing and measuring up to all of an ink set's Neugebauer primaries (NPs), computing the convex hull of the measurements, tessellating the convex hull using at least the convex hull vertices, and for any color inside the convex hull, finding the enclosing tetrahedron and determining the weights with which the vertices can be combined to give the chosen color, where the weights are the relative area coverages needed for each of the vertex NPs. The present disclosure may further relate to finding NPacs that are optimized according to a certain print attribute, wherein the print attribute may for example be a minimal ink usage, grain, color constancy, or another attribute. A convex hull of colors available on a system may be addressed, wherein the NPs are optimized for minimal ink usage.

FIG. 1 illustrates an exemplary printing system 1. The print system 1 may comprise a printer 2 of a predetermined type. Without intending to limit to a specific type of printer 2, the printer 2 may comprise a large or small format printer, a laser printer, an inkjet printer, an offset printer, a digital press, a dot-matrix printer, a line printer, and/or a solid ink printer.

The printing system 1 can be driven, at least in part, by one or more suitable computing devices 3. Computing devices 3 that may be used include, but are not limited to, a personal computer, a laptop computer, a desktop computer, a digital camera, a personal digital assistance device, a cellular phone, a video player, and other types of image sources.

The printer 2 may comprise a print head arranged to print on a substrate 4. The substrate 4 may comprise any type of substrate, for example, but not limited to, paper, films, foils, textiles, fabrics or plastics. The printer 2 may comprise, or be connected to, a certain ink set 5. The ink set 5 may comprise a predetermined number of inks, for example four inks which may be Cyan, Magenta, Yellow and Black (CMYK). The ink set 5 may be determined by the printer 2, wherein different printers 2 correspond to different ink sets 5, or different ink sets 5 may be applied in one printer 2.

The computing device 3 may be physically integrated with or connected to the printer 2. The computing device 3 may be arranged to process image data. The computing device 3 may be arranged to separate and/or convert colors. The computing device 3 may comprise a processing circuit 6 and a storage device 7. The storage device 7 may facilitate any type of computer data storage. The storage device 7 may comprise, but should not be limited to, any type non-volatile memory such as a hard disk, a solid state storage device, a ROM (Read Only Memory), an exchangeable data carrier, etc. The storage device 7 may store data, drivers, and computer programs, amongst others.

For example, an image for printing may be retrieved from the storage device 7, a remote storage location 8, such as an online application, using the Internet, and/or a local area network. Furthermore, a graphical user interface 9 may be provided for allowing an operator to change or interact with the print system 1.

This disclosure may relate to facilitating a color separation that is optimized for a certain print attribute. The print attribute may comprise minimum ink usage. A color separation table 10 may be provided, comprising NPacs optimized for minimal ink usage. The color separation table 10 may be stored in a print system driver, for example a printer driver 11. The storage device 7 may store the table 10. The table 10 may be stored on software running on the computing device 3 and/or the printer 2, and/or on a remote storage location 8. In this description, a method and system of using such table 10 will be described, as well as a method and system of obtaining such table 10.

Certain features of the print system 1 may influence an outgoing image color for a given color input value, for example an input RGB value. For example, a specific ink set 5, and/or substrate 4 may influence the actual printed color. Therefore, the color separation table may be calculated for specific print system 1, for example for specific printers 2, ink sets 5 and/or substrates 4.

The printing system 1 may employ an embodiment of a color separation interface and image processing system referred to as Halftone Area Neugebauer Separation (HANS), as described in U.S. patent application Ser. No. 12/390,214.

Figure 2:
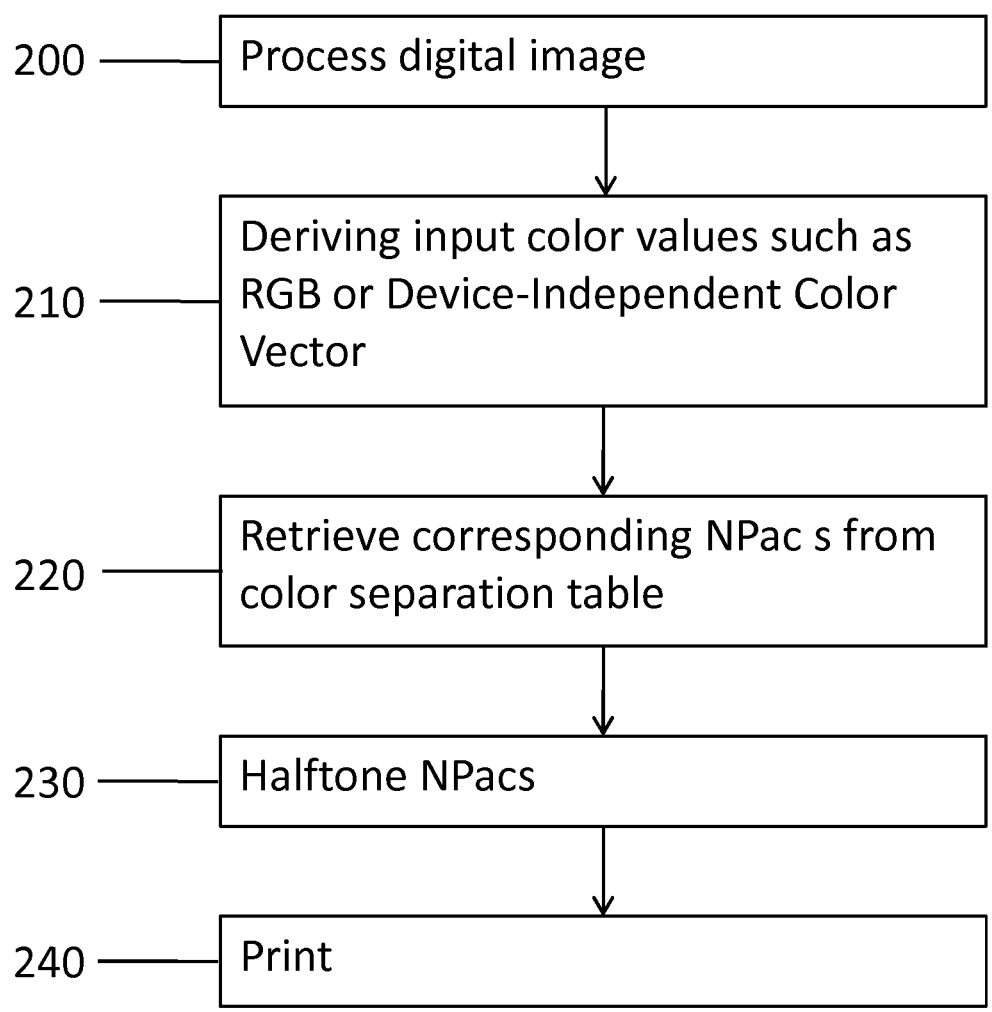
FIG. 2 shows a flow chart of a printing process using a color separation table.

FIG. 2 illustrates a color separation process and a halftoning process. In step 200, an image may be processed by the print system 1. For example the image may be received through a network or a data carrier. The image may be processed by the print system 1. For example, an input digital image may be transformed via its embedded ICC profile, and the printer's ICC profile, which may result in a continuous virtual device dependent RGB (Red, Green, and Blue) image or device independent CIE XYZ or CIE LAB values. Device independent values may be processed as input for step 220.

In an embodiment, in step 210, the device dependent RGB values may be received as input. The received RGB image may be mapped to CIE XYZ so that the RGB cube bijects with the NPac's convex hull in the CIE XYZ color space.

In step 220, the system 1 may map each of the XYZs onto an NPac. The matching NPac may be retrieved from the color separation table 10. For example the table 10 may link NPacs to CIE XYZ values that are specific for the concerning print system 1, i.e. printer 2, ink set 5 and/or substrate 4.

The respective NPacs in the table 10 may be optimized for minimal ink usage. Instead of, or in addition to, minimal ink usage, the respective NPacs in the table may be optimized for other print attributes such as, but not limited to, color constancy and/or grain.

The retrieved NPacs may then be communicated to a halftoning process in step 230. Halftoning may be used to define a spatial arrangement of the NPs specified in the input NPac vectors. For example, Vector Error Diffusion or Device State Error Diffusion (DSED) may be applied as a halftoning technique, wherein the NPs are its states and the error is diffused in the NPac space. Halftoning in relation to NPacs is described in U.S. patent application Ser. No. 12/390,214.

An NPac may specify a certain distribution of NPs by corresponding relative area coverages, for each unit area. However, each pixel may only have one corresponding NP. For instance, if the printer 2 attempts to have 50% of a cyan NP and 50% of a magenta NP at a single pixel and the halftoning chooses to use the magenta NP at that pixel, there will be 50% too little of the cyan NP and 50% too much of the magenta NP, and an error will therefore be the result. In DSED, the difference between the desired NPac and the NP placed may be distributed or diffused using known error diffusion methods to one or more neighboring pixels. Example error diffusion methods include, but are not limited to, error randomization, serpentine processing, and the like.

In step 240, the input image may be printed as a hard copy using, for example optimized low ink usage, having the full available gamut available.

Figure 3:
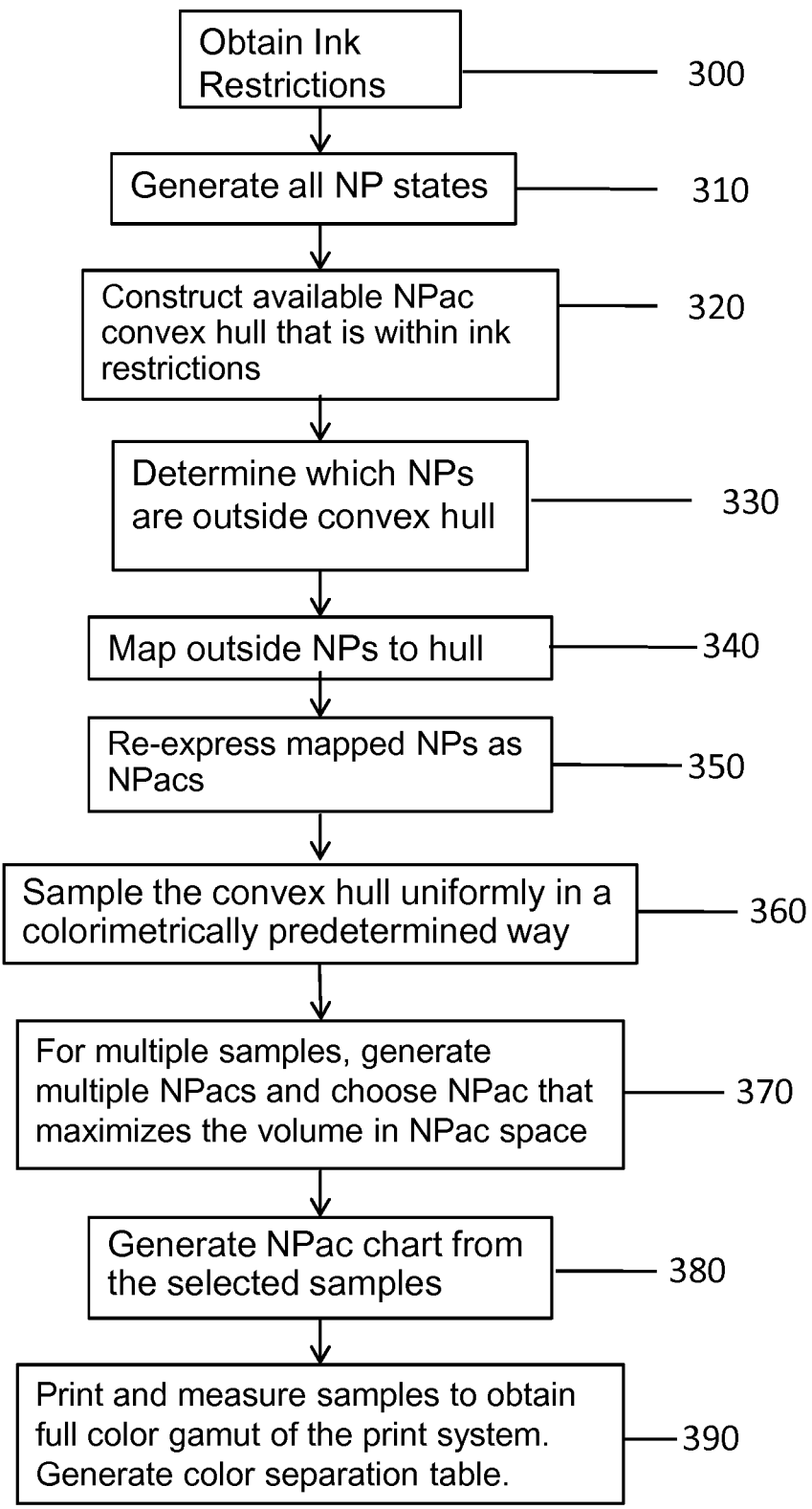
FIG. 3 shows a flow chart of a method of determining a color gamut of a predetermined ink system.

In this disclosure, an embodiment of a method of obtaining color separation table 10 is described with reference to FIG. 3. In step 300, the ink restrictions of the print system 1 may be determined. For example, the total ink limit per halftone pixel may be determined. Also, the cut-off per ink may be determined, i.e. the maximum ink drop amount for each ink may be determined per halftone pixel. In another step 310, all of the different NP states of the print system 1 may be generated.

In another step 320, given the ink restrictions that were determined in step 300, available NPacs may be determined that comply with the ink restrictions. A convex hull of the complying NPacs may be generated so that an available NPac space of the print system 1 may be obtained. In step 330 it may be determined which of the NP states generated in step 310 are outside of the convex hull generated in step 320. In step 340, those NP states that are outside of the convex hull may be mapped onto the convex hull so as to comply with the ink restrictions determined in step 300.

The NPs that were mapped in step 340 may be re-expressed as NPacs, as indicated by step 350. The convex hull of NPacs, including the mapped NPs, may be sampled uniformly and in a colorimetrically predetermined way, e.g. in CIE LAB or CIE XYZ, as indicated by step 360. In step 370, the NPac volume may be maximized. Multiple NPacs may be generated for one or each sample and the NPac corresponding to the largest NPac space volume may be chosen. This may be repeated for multiple samples and/or for each sample. The volume maximization may take place in N dimensions, N being defined by the number of possible ink drop states k per halftone pixel to the power of the number n of inks ($N=k^n$).

The volume maximization may be regarded as equivalent to the problem of sampling a 3-dimensional convex polytope and a corresponding N-dimensional polytope with uniformity in the three dimensions and volume maximization in the N dimensions, wherein the 3-dimensional polytope may correspond to the colorimetric space, and the n-dimensional polytopes may correspond to the NPac space.

A chart may be generated of the samples and chosen NPacs, as indicated by step 380. The samples may be printed and measured to obtain a full color gamut of the print system 1, as indicated by step 390. The measured values may be defined by a predetermined colorimetric value such as CIE XYZ or CIE LAB. The measured values and/or the samples may be linked to the chosen NPacs.

Hence, the color separation 10 may be obtained by linking NPacs to predetermined colorimetric values. In addition, further optimization may be executed for example to optimize a certain print attribute such as ink usage.

The method of determining a color gamut of the print system 1 as described above addresses the full color gamut of the substrate given a set of ink restrictions. Hence, the print system 1 may provide for better printed colors than known systems. A large NPac volume may be generated so that a relatively large solution space is found, which in turn may allow the print system 1 to find better optima for given colors. This may be an improvement with respect to most known print system pipelines, wherein the ink limit is addressed in ink vector space, and only a single ink vector per ink limit sample is determined. Known systems therefore give access to a relatively small variety of printable outputs at the ink limit.

In a first aspect, a method of determining a color gamut of a predetermined print system is provided. The method may comprise (i) determining ink restrictions of the print system 1, (ii) generating all NP states of the print system 1, (iii) generating a convex hull of area coverages of NPs that do not exceed said ink restrictions, (vi) determining which NP states are outside of the convex hull, (v) mapping NP states that are outside of the convex hull onto the convex hull, (vi) re-expressing the mapped NP states as area coverages of NPs, and (vii) sampling the convex hull in a colorimetric space.

The method may be executed with the aid of a programmed algorithm. Therefore, in a second aspect a computer program product for determining a color gamut of a predetermined print system may be provided. The computer program may comprise instructions that when executed by a processing circuit instruct a processing circuit to perform a method comprising (i) determining ink restrictions of the print system, (ii) generating all NP states of the print system, (iii) generating a convex hull of area coverages of NPs that do not exceed said ink restrictions, (vi) determining which NP states are outside of the convex hull, (v) mapping NP states that are outside of the convex hull onto the convex hull, (vi) re-expressing the mapped NP states as area coverages of NPs, and (vii) sampling the convex hull in a colorimetric space.

As will be understood by the skilled person, in the above description and in the claims, the term "maximizing" may be understood as an act of enlarging a certain volume or space. It should not be understood as an act of reaching an absolute undisputable maximum per se.

The above description is not intended to be exhaustive or to limit the invention to the embodiments disclosed. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, while a reference to a certain number of elements does not exclude the possibility of having more elements. A single unit may fulfil the functions of several items recited in the disclosure, and vice versa several items may fulfil the function of one unit.

The mere fact that certain measures are recited in mutually different dependent claims does not indicate that a combination of these measures cannot be used to advantage. Multiple alternatives, equivalents, variations and combinations may be made without departing from the scope of the invention.

What is claimed is:

1. Method of determining a color gamut of a predetermined print system, comprising:
   generating all Neugebauer-Primary (NP) states of the print system, said NP status including at least one NP state corresponding to a mixture of different inks;
   determining ink restrictions that are met by some of said NP states but are not met by at least one of said NP states,
   generating a convex hull of area coverages of NPs that meet said ink restrictions,
   determining which NP states are outside of the convex hull,
   mapping NP states that are outside of the convex hull onto the convex hull,
   re-expressing the mapped NP states as area coverages of the NPs used to generate the convex hull, and
   sampling the convex hull in a colorimetric space.

2. Method according to claim 1, comprising
   calculating different possible area coverages of NPs corresponding to one sample,
   choosing the area coverage of NPs that maximizes the volume of the available NP area coverage space,
   generating a chart of area coverages of NPs that correspond to selected samples, and
   printing and measuring the area coverages of NPs to obtain the color gamut of the print system.

3. Method according to claim 2, wherein the volume maximization by choosing between area coverages of NPs takes place in N dimensions, N being defined by the number of possible ink drop states per halftone pixel to the power of the number of inks.

4. Method according to claim 1, comprising generating a chart that maps the area coverages of NPs to the colorimetrically defined samples.

5. Method according to claim 1, wherein the ink restrictions comprise a total ink limit per halftone pixel.

6. Method according to claim 1, wherein the ink restrictions comprise a cut-off per ink.

7. Computer program product for determining a color gamut of a predetermined print system, comprising non-transitory computer-readable storage media encoded with instructions that when executed by a processing circuit instruct the processing circuit to perform a method including:
   generating all NP states of the print system, said NP states includes at least one NP state corresponding to a mixture of different inks,
   determining ink restrictions that are met by some of said NP states but are not met by at least one of said NP states,
   generating a convex hull of area coverages of NPs that meet said ink restrictions,
   determining which NP states are outside of the convex hull,
   mapping NP states that are outside of the convex hull onto the convex hull,
   re-expressing the mapped NP states as area coverages of the NPs used to generate the convex hull, and
   sampling the convex hull in a colorimetric space.

* * * * *

UNITED STATES PATENT AND TRADEMARK OFFICE
CERTIFICATE OF CORRECTION

PATENT NO. : 8,670,167 B2  
APPLICATION NO. : 12/605715  
DATED : March 11, 2014  
INVENTOR(S) : Jordi Arnabat Benedicto et al.

Page 1 of 1

It is certified that error appears in the above-identified patent and that said Letters Patent is hereby corrected as shown below:

In the Claims

In column 6, line 12, in Claim 1, delete "status" and insert -- states --, therefor.

In column 6, line 51, in Claim 7, delete "includes" and insert -- including --, therefor.

Signed and Sealed this  
Fifteenth Day of July, 2014

Michelle K. Lee  
*Deputy Director of the United States Patent and Trademark Office*